United States Patent [19]

Pepi

[11] 4,182,438
[45] Jan. 8, 1980

[54] SHOCK ABSORBER WITH IMPROVED COMPRESSION VALVE ASSEMBLY

[75] Inventor: Jerome S. Pepi, North Attleboro, Mass.

[73] Assignee: Maremont Corporation, Chicago, Ill.

[21] Appl. No.: 895,079

[22] Filed: Apr. 10, 1978

[51] Int. Cl.² ............................................. F16F 9/34
[52] U.S. Cl. .............................. 188/322; 137/543.15
[58] Field of Search .............................. 188/315, 322; 137/543.15

[56] References Cited

U.S. PATENT DOCUMENTS

| | | | |
|---|---|---|---|
| 2,518,553 | 8/1950 | Kieber | 137/543.15 |
| 2,619,199 | 11/1952 | Schwary | 188/315 |
| 3,003,595 | 10/1961 | Patriquin | 188/315 |
| 3,173,671 | 3/1965 | Broadwell | 188/315 |
| 4,095,682 | 6/1978 | Ostrowski | 188/322 |
| 4,109,767 | 8/1978 | Nandyal et al. | 188/315 |

Primary Examiner—Edward R. Kazenske
Attorney, Agent, or Firm—Cushman, Darby & Cushman

[57] ABSTRACT

A twin tube shock absorber having an improved compression valve mechanism comprising a one-piece thin wall member including a generally cylindrical body portion having an annular flange portion extending generally radially outwardly from the upper end thereof and a cup-shaped portion of reduced diameter on the lower end thereof. The annular flange portion has at least one upward deformation formed therein defining a generally radially extending flow passage beneath the flange portion between the periphery thereof and the cylindrical portion. The thin wall member is mounted with respect to the base member with the annular flange portion thereof engaging the annular flange receiving surface of the base member, the cylindrical portion extending through the base member opening and the end portion spaced below the annular valve seat of the base member. A coil spring is disposed in surrounding relation to the cylindrical portion of the thin wall member between a spring retaining washer fixed to the member by deformation of the reduced end portion thereof and a valve member resiliently urged into engagement with the annular valve seat.

3 Claims, 5 Drawing Figures

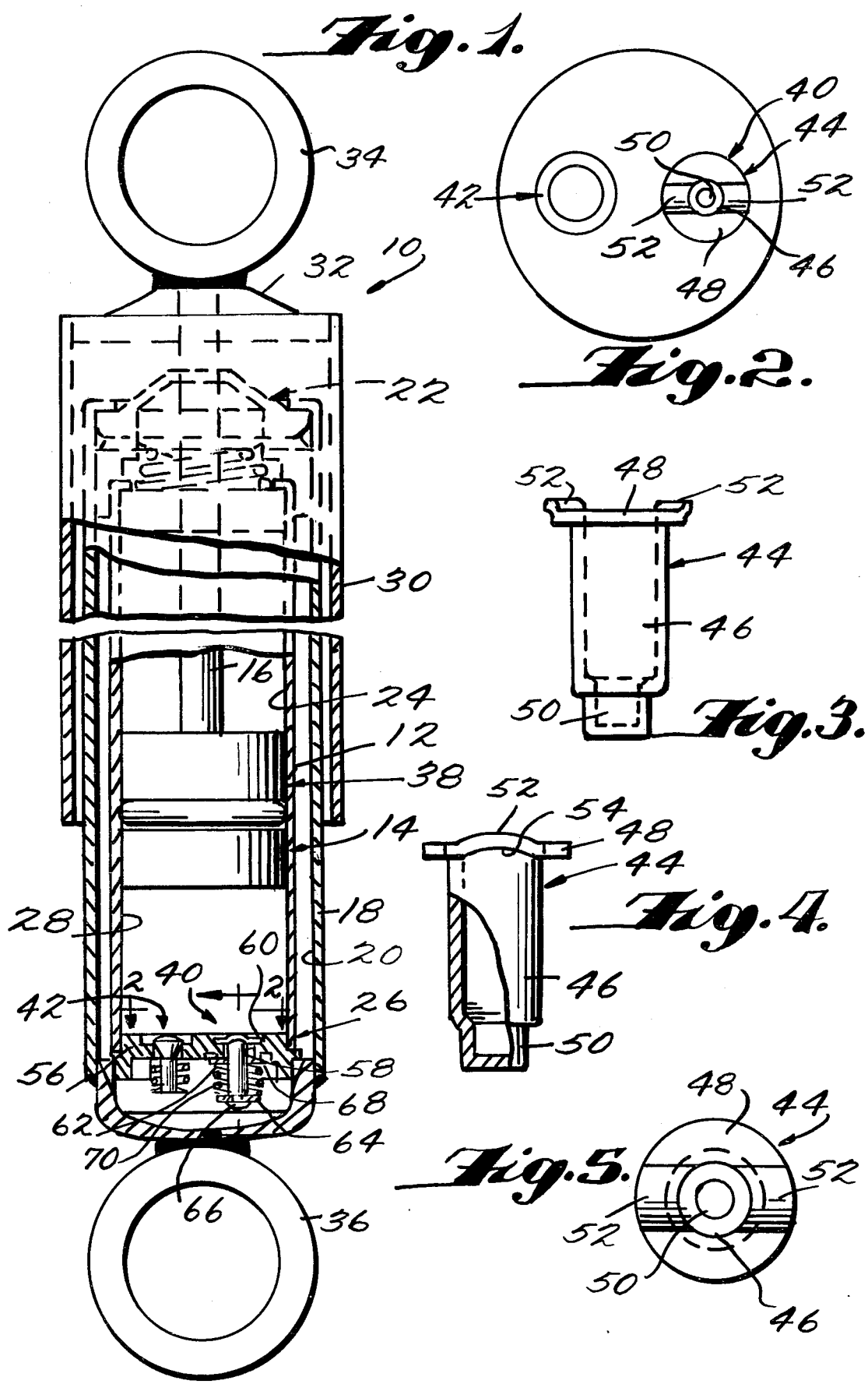

SHOCK ABSORBER WITH IMPROVED COMPRESSION VALVE ASSEMBLY

This invention relates to shock absorbers and more particularly to improvements in shock absorbers of the twin tube type.

Twin tube shock absorbers are a well-known type of shock absorber, the name being derived from the fact that the cylinder part of the shock absorber is formed by two concentric tubes, the inner one being the cylindrical member within which the piston assembly of the shock absorber is slidably mounted. The other tube which surrounds the inner tube is usually referred to as an intermediate tube, particularly in shock absorber constructions where an outer dust tube is provided. The inner cylindrical tubular member and intermediate tube define therebetween an annular revervoir chamber for containing a supply of hydraulic shock absorber fluid sufficient to accommodate the piston rod displacement of the shock absorber during operation. In the usual construction, the ends of the twin tubes opposite from the ends through which the piston rod of the unit extend are fixedly interconnected by a base and end cap assembly. This base and end cap assembly includes a base member which defines the end of the rebound chamber within the inner cylindrical member below the piston assembly. Conventionally, the base and end cap assembly includes a compression valve assembly which serves to provide a restriction control for the flow of hydraulic fluid from the compression chamber into the reservoir or replenishing chamber during a compression movement of the piston assembly and a replenishing valve which is operable to permit the flow of fluid from the reservoir or replenishing chamber into the compression chamber during a rebound movement of the piston assembly. Examples of conventional compression valve assemblies are disclosed in the following U.S. Pat. Nos. 2,518,553; 2,619,199; and 3,003,595.

The latter patent illustrates a typical compression valve construction in which there is provided an opening in the base member having a flange receiving annular surface surrounding the same which faces upwardly toward the compression chamber of the shock absorber and an annular valve seat facing downwardly from the lower end of the opening in surrounding relation thereto. A stud member is mounted through the opening and has a flange which seats on the flange receiving surface. The lower end of the stud member is of reduced diameter so as to receive a spring retaining washer, which washer is fixedly secured to the lower end of the stud by deforming the reduced end of the stud thereover in rivet fashion. An apertured disk valve is slidably engaged over the central cylindrical portion of the stud member for movement toward and away from the valve seat, the valve member being resiliently biased to engage the valve seat by a coil spring surrounding the stud and disposed between the valve member and the spring retaining washer. Flow of hydraulic fluid from the compression chamber to the upper surface of the valve member is provided by drilling a central bore into the upper end of the stud and two communicating bores radially through the stud in communicating relation to the main bore.

While the stud member is capable of being manufactured on automatic machinery, the fact that the stud is formed by machining operations necessitates excessive initial material costs as well as fabrication costs. There is always a need in mechanisms of this type which have been used for many years to decrease costs involved without decreasing the quality of the product in terms of performance.

It is an object of the present invention to provide improvements in the compression valve assembly of a shock absorber of the twin tube type which reduces the costs heretofore encountered without reducing the quality of performance.

In accordance with the principles of the present invention, this objective is obtained by utilizing in lieu of the stud construction heretofore employed, a thin wall member which is capable of being fabricated by a stamping operation. The thin wall member includes a generally cylindrical body portion having an annular flange portion extending generally radially outwardly from the upper end thereof and a cup-shaped portion of reduced diameter on the lower end thereof. Formed within the annular flange portion is at least one, and preferably two, diametrically opposed upward deformations, each of which defines a generally radially extending flow passage beneath the flange portion between the periphery thereof and the cylindrical portion of the thin wall stud member. The cup-shaped end portion of the thin wall member can be deformed in rivet fashion over a spring retainer washer in a manner similar to the stud members of the prior art. The recesses beneath the flange portion of the thin wall member provide the hydraulic flow function previously performed by the drilling holes of the stud member of the prior art. Accordingly, it can be seen that the stud member of the present invention is constructed so as to be radially formed in a stamping operation and consequently its fabrication is favorable economically. Moreover, the structural integrity, as well as the accuracy of the stud member, is comparable to that which is achieved in the prior art while at the same time utilizing less metal.

Accordingly, it is a further object of the present invention to provide an improved compression valve assembly in a shock absorber of the twin tube type which is simple in construction, efficient in operation and economical to manufacture and assemble.

These and other objects of the present invention will become more apparent during the course of the following detailed description and appended claims.

The invention may best be understood with reference to the accompanying drawings, wherein an illustrative embodiment is shown.

In the drawings:

FIG. 1 is a side elevational view, partly in section, of a shock absorber embodying the principles of the present invention;

FIG. 2 is an enlarged fragmentary sectional view taken along the line 2—2 of FIG. 1;

FIG. 3 is a front elevational view of a thin wall stud member constructed in accordance with the principles of the present invention;

FIG. 4 is a side elevational view of the stud member shown in FIG. 3, partly in section; and FIG. 5 is a top plan view of the stud member shown in FIG. 3.

Referring now more particularly to the drawings, there is shown in FIG. 1 thereof a shock absorber, generally indicated at 10, which embodies the principles of the present invention. The shock absorber includes the usual inner tube or cylinder member 12 within which is slidably mounted a piston assembly, generally indicated at 14. A piston rod 16 is fixedly connected with the piston assembly 14 and extends axially therefrom outwardly through one end of the cylinder member. An intermediate tube 18 is disposed in surrounding relation with the cylinder member 12. The interior of the intermediate tube defines with the exterior of the cylinder member an annular reservoir chamber 20.

Fixedly connected with the upper end of the cylinder member 12 and the upper end of the intermediate tube 18 is a seal assembly, generally indicated at 22, which serves to slidably receive the piston rod 16 therethrough. The seal assembly is of conventional construction and serves to enclose the upper end of the reservoir chamber 20 and to define the upper end of a rebound chamber 24 within the cylinder member 12, the lower end of which is defined by the piston assembly 14. The volume of the rebound chamber 24 is thus variable depending upon the position of the sliding movement of the piston assembly 14 within the cylinder member 12, as is well known in the art.

A base and end cap assembly, generally indicated at 26, is fixedly connected with the lower end of the cylinder 12 and intermediate tube 18. The base and end cap assembly 26 embodies the improvements of the present invention and serves to partially enclose the lower end of the reservoir chamber 20 and to provide for controlled communication thereof with the lower end of a compression chamber 28 within the cylinder member 12, the lower end of which is defined by the base and end cap assembly and the upper end of which is defined by the piston assembly 14. The compression chamber 28 is variable in volume, depending upon the position of sliding movement of the piston assembly 14 within the cylinder member 12.

The shock absorber 10 also includes the usual outer dust tube 30, the upper end of which is suitably connected with the outer end of the piston rod 16. It will be understood, however, that in accordance with conventional procedure the dust tube may be eliminated where required to suit the particular installation. As shown, this connection is effected by an end cap 32 to which is rigidly secured a mounting connector 34. The connector 34 may be of any conventional configuration, such as the ring as shown or a stud. A similar mounting connector 36 is fixedly secured to the exterior of the base and end cap assembly 26. Other mounting arrangement rendering the shock absorber suitable for use in a McPherson strut assembly may be employed. In accordance with conventional practice, the shock absorber 10 when mounted in operative relation on a vehicle is generally oriented so that the connector 34 secured to the outer end of the piston rod 16 is disposed upwardly while the other connector is oriented in a downward position with respect thereto.

It will be understood that the shock absorber 10 is also provided with hydraulic fluid which fills both the rebound and compression chamber 24 and 28 and partially fills the replenishing or reservoir chamber 20. In accordance with conventional practice, the riding characteristics of the shock absorber are determined by controlling the flow of hydraulic fluid between the various chambers during the telescopic movements of the shock absorber occasioned by the relative movement of the sprung and unsprung masses of the vehicle. Compression control of the hydraulic fluid is accomplished when the piston assembly 14 is moved in a downward direction causing the compression chamber 24 to reduce volume and the rebound chamber 24 to increase in volume. Control of the flow of hydraulic fluid from the reducing volume compression chamber to the increasing volume rebound chamber is provided by an annular valve assembly 38 mounted on the periphery of the piston assembly 14 and disposed in flow control relation with the interior of the cylinder member 12. Here again, the construction of the piston compression valve assembly 38 is of a conventional nature. Since the rebound chamber 24 contains the piston rod and the compression chamber does not, the differential volume of hydraulic fluid in decreasing volume compression chamber 28 must pass to the reservoir chamber 20. Control of this flow is accomplished by a compression valve assembly 40 mounted in the base and end cap assembly 26 constructed in accordance with the principles of the present invention.

Rebound control is accomplished when the piston assembly 14 moves upwardly within the cylinder member 12. Under these circumstances hydraulic fluid must pass from the decreasing volume rebound chamber 24 into the increasing volume compression chamber 28. Here again, because of the piston rod displacement, additional hydraulic fluid must be introduced into the increasing volume compression chamber and such hydraulic fluid comes from the replenishing or reservoir chamber 20. Control of the latter flow is accomplished by means of a replenishing valve 42 mounted in the base and end cap assembly 26. Replenishing valve 42 is of conventional construction and its seat may be provided with bleed passages in accordance with known practice for providing fixed compression control bleed openings.

An important aspect of the present invention in the construction of the compression valve assembly 40 is the utilization of a thin wall stud member, which is generally indicated by the reference numeral 44. The thin wall stud member includes a cylindrical body portion 46 having an annular flange portion 48 extending generally radially outwardly from the upper end thereof and a generally cup-shaped end portion 50 of reduced diameter formed on the lower end of the cylindrical portion 46. As shown, the annular flange portion 48 of the thin wall member 44 has formed therein a pair of diametrically opposed upward deformations 52, each of which defines in a position beneath the annular flange portion 48 a generally radially extending flow passage 54 between the periphery of the flange member and the cylindrical body portion 46 of the thin wall member 44.

The base and end cap assembly 26 includes a base member 56 having an opening 58 extending therethrough which is of a diameter size slightly greater than the diameter size of the cylindrical body portion 46 of the thin wall stud member 44. Formed in the upper portion of the base member 56 is a recess which defines an upwardly facing annular flange receiving surface 60 surrounding the opening 58. The base member also includes a downwardly facing annular valve seat 62 surrounding the lower end of the opening 58. Stud member 44 is mounted with respect to the base member 56 with the flange portion 48 disposed in engagement with the annular flange receiving surface 60, the cylindrical portion 46 extending through the opening 58 and the lower end portion 50 disposed in spaced relation to the annular valve seat 62.

The compression valve assembly 40 also includes a spring retaining washer 64 having a central opening which receives the cup-shaped end portion 50 of the stud member 44. The washer is retained in fixed relation with respect to the stud member 44 by deforming the cup-shaped end portion 50 in rivet fashion over the washer as indicated at 66.

The compression valve assembly 40 also includes an apertured valve member 68 which is slidably mounted on the cylindrical body portion 40 of the thin wall stud member 44 for movement toward and away from the valve seat 62. A coil spring 70 serves to resiliently urge the valve member 68 into engagement with the valve seat and the flange portion 48 of the thin wall stud member 44 into engagement with the flange receiving surface 60. As shown, the coil spring 70 surrounds the cylindrical body portion 46 of the study member and has its lower end seated on the washer 46 and its upper end seated on the valve member 68.

During operation when the piston 14 is moved downwardly through a compression stroke hydraulic fluid within the compression chamber 28 is moved outwardly therefrom into the replenishing chamber 20 under the control of the compression valve assembly 40. This control includes a flow of hydraulic fluid through the radial recesses 54, the annular space defined between the interior periphery of the opening 58 and the exterior periphery of the cylindrical body portion 46 of the thin wall member 44 and then between the valve member 68 and valve seat 62. The extent of the movement of the valve member 68 away from the valve seat 62 is controlled by the spring 70.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

What is claimed is:

1. A shock absorber comprising:

a cylinder member;

a piston assembly having an axis aligned with the axis of said cylinder member and a piston rod fixed to said piston assembly and extending axially therefrom outwardly of one end of said cylinder member disposed upwardly when said shock absorber is operatively mounted, an intermediate tube surrounding said cylinder member the interior of which defines with the exterior of said cylinder member an annular reservoir chamber, a seal assembly fixedly connecting the upper end of said cylinder member to the upper end of said intermediate tube and slidably sealingly receiving said piston rod therethrough so as to define the upper end of a rebound chamber within said cylinder member the lower end of which is defined by the piston assembly and the volume of which is variable depending upon the position of sliding movement of said piston assembly within said cylinder member, a base and end cap assembly fixedly connecting the lower end of said cylinder member and said intermediate tube so as to define the lower end of a compression chamber within said cylinder member the upper end of which is defined by the piston assembly and the volume of which is variable depending upon the position of sliding movement of said piston assembly within said cylinder member, said base and end cap assembly including a fixed base member;

hydraulic fluid filling said rebound and compression chambers and partially filling said reservoir chamber, means on said piston assembly providing for the controlled restricted flow of hydraulic fluid from said compression chamber to said rebound chamber during the compression movement of said piston member toward said lower end of said cylinder member and from said rebound chamber to said compression chamber during the rebound movement of said piston member toward said seal assembly, compression valve means in said base member providing for controlled flow of hydraulic fluid from said compression chamber to said reservoir chamber during said compression movement, and replenishing valve means in said base member for enabling hydraulic fluid to flow from said reservoir chamber to said compression chamber during a rebound movement of said piston assembly toward said seal assembly, the improvement which comprises said compression valve means comprising a one-piece thin wall member including a generally cylindrical body portion having an annular flange portion extending generally radially outwardly from the upper end thereof and a cup-shaped portion of reduced diameter on the lower end thereof, said annular flange portion having at least one upward deformation formed therein defining a generally radially extending flow passage beneath said flange portion between the periphery thereof and said cylindrical portion, said base member having an opening of a size greater than the size of said cylindrical portion extending therethrough, an annular flange receiving surface surrounding the upper end of said opening and an annular valve seat surrounding the lower end of said opening, said thin wall member being mounted with respect to said base member with the annular flange portion thereof engaging the annular flange receiving surface of said base member, said cylindrical portion extending through said opening and said end portion spaced below said annular valve seat, a spring retaining washer having a central opening receiving the cup-shaped end portion of said thin wall member therethrough, said cup-shaped end portion being deformed in rivet fashion to rigidly secure said washer to said thin wall member, an apertured valve member slidably mounted on the cylindrical portion of said thin wall member for movement toward and away from said valve seat, and a coil spring surrounding the cylindrical portion of said thin wall member between said spring retaining washer and said valve member for resiliently urging the latter into engagement with said annular valve seat.

2. The improvement as defined in claim 1 wherein said annular flange receiving surface is formed by a recess in the upper surface of said base member.

3. The improvement as defined in claim 1 or 2 wherein the annular flange portion of said thin wall member includes a pair of upward deformations disposed in generally diametrically opposed relation to one another.

* * * * *